(No Model.)

J. A. STEINMETZ.
CHAIN LINK.

No. 567,323.  Patented Sept. 8, 1896.

WITNESSES:
William J. Fisher
Joseph W. Gunter

INVENTOR
Joseph A. Steinmetz
BY Charles N. Butler
ATTORNEY

UNITED STATES PATENT OFFICE.

JOSEPH ALLISON STEINMETZ, OF PHILADELPHIA, PENNSYLVANIA.

CHAIN-LINK.

SPECIFICATION forming part of Letters Patent No. 567,323, dated September 8, 1896.

Application filed May 27, 1896. Serial No. 593,256. (No model.)

*To all whom it may concern:*

Be it known that I, JOSEPH ALLISON STEINMETZ, a citizen of the United States, residing in the city of Philadelphia, State of Pennsylvania, have invented certain new and useful Improvements in Chain-Links, of which the following is a full, clear, and exact description.

The object of my invention is to produce a chain-link of cheap and simple construction, without weld, loose parts, or projecting ends, and which will afford the greatest possible resistance and be incapable of collapse.

My invention is illustrated in the accompanying drawings, in which—

Figure 4:
Figure 5:
Figure 2:
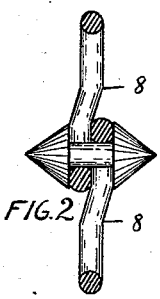
Figure 1:
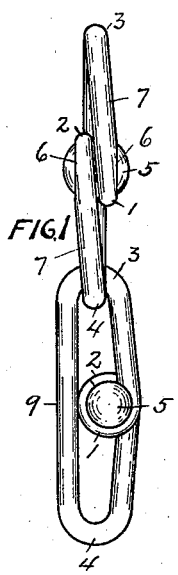
Figure 3:
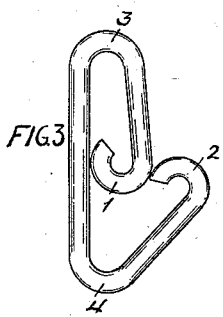
Figure 6:
Figure 7:

Figure 1 illustrates two connected links; Fig. 2, a longitudinal sectional view of the lap-joint and a conical-headed rivet; Fig. 3, a link spread to show the construction; Fig. 4, a transverse sectional view of the lap-joint flattened and a flat-headed rivet; Fig. 5, a transverse sectional view of the lap-joint and a rivet with overlapping head; Figs. 6 and 7, forms of eyes that may be used, and Fig. 8 a preferred shape of link.

Figure 8:
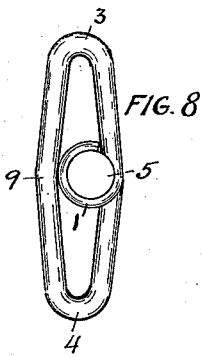

The finished links shown in Figs. 1 and 8 are bent up from metal of the desired quality and size, the section of bar or rod to form the link having its ends bent or turned over to form the eyes 1 and 2, and again reflex at the points 3 and 4 to form the link. The eyes are brought into registration and a rivet 5 is inserted and upset, forming a lap-joint union. The eyes may be closed, as shown in Figs. 6 and 8, or left partially open, as shown in Figs. 3 and 7, the desired end being attained when each end of the bar has been bent far enough around to pass and be engaged by the opposite side 9 of the link. When the rivet is set, closing the joint, and the link is subjected to tensile stress, the joint will bear against the opposite side of the link and act as a strut to prevent collapse between the two sides of the link. The greater the tensile stress upon the link the more firmly will the eyes be bound in place by the tendency of the two parallel sides of the link to draw together, and the rivet will thus be locked against any possibility of jumping out of place.

The outer faces 6 of the eyes may be flattened parallel with the plane of the link, (in order that the rivet may lie at right angles to this plane and to the line of pull,) and the section 7 of the link, between the end and the eye, may be straight, as illustrated in Fig. 1, or this section of the link may be bent, as at 8 in Fig. 2, to permit the rivet to lie at right angles to the plane of the link, and in the direct line of pull, thus throwing the shearing stress into the middle of the rivet and facilitating the setting of the rivet.

The head of the rivet may be made of the form best adapted for strength or the specific use to which the chain is to be put. The conical head shown in Fig. 2 is adapted for certain uses, as in serrated sheaves or runways for lining the chain. The flattened eyes and head of Fig. 4 give increased strength and adapt the chain for running through blocks and tackles. The overlapping head shown in Fig. 5 binds the eyes and adapts the chain for free-running uses. The construction generally prevents the accumulation of dirt and rust and obviates cutting, chafing, and tearing when the chain is running out. As all welding is dispensed with, non-weldable metal and metal that welds imperfectly may be used, and the links may be formed either hot or cold. I may use bronze, aluminium, crucible steel, or other steel high enough in carbon to give great tensile strength and hardness on tempering. The rivet may be made of such strength that shearing is impossible, and in the event repair is necessary the rivet can be cut and a link readily replaced.

It may sometimes be desirable, as in the case of heavy chains, where bending up the eye is difficult, to hot-weld the joint, which may be flattened to approximately the thickness of the metal forming the link and then reinforced by means of a rivet passed through eyes in the overlapping ends formed either by bending or drilling. (See Fig. 4.)

It is evident that various modifications may be made in the construction without departing from the spirit of my invention, and I wish to be understood as not limiting myself to the specific details of construction shown and described.

Having thus described my invention, I claim as new—

1. A chain-link formed from a bar or rod having its ends bent in the form of eyes, and reflexed until the eyes are brought into registration, and the union formed by a rivet passed through the eyes and upset, substantially as shown and described.

2. A chain-link formed from a bar or rod, having eyes in its ends, and reflexed until the eyes are brought into registration, a rivet passing through the eyes and upset forming a lap-joint, the said joint being placed so as to act as a strut, to prevent the collapse of the link, substantially as shown and described.

3. A chain-link having its union formed by a lap-joint approximately at the middle of the link, and having the rivet binding the joint set at right angles to the plane of the link, and to the line of pull, substantially as shown and described.

4. A chain-link formed from a bar or rod having its ends bent in the form of eyes and reflexed until the eyes are brought into registration and into binding relation with the opposite side of the link, in combination with a rivet inserted through the eyes and upset to form the union, substantially as shown and described.

In testimony whereof I have hereunto set my hand this 23d day of May, 1896.

JOSEPH ALLISON STEINMETZ.

In presence of—
   JOS. A. JANNEY, Jr.,
   A. R. LAW.